A. W. DUCK.
BICYCLE SEAT ATTACHMENT.
APPLICATION FILED SEPT. 9, 1908.
924,541.
Patented June 8, 1909.
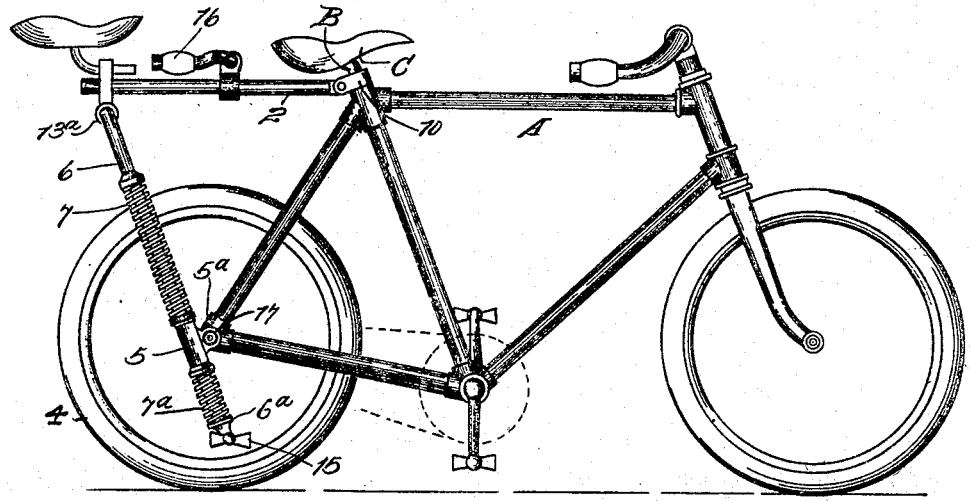
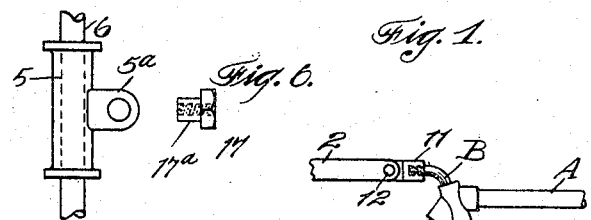
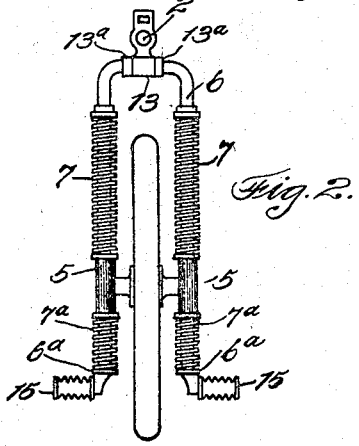
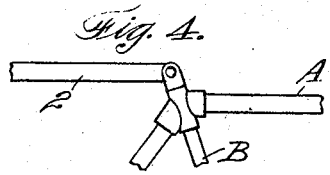
WITNESSES
F. E. Maynard
Ca. Penfield
INVENTOR:
Abram W. Duck.
BY Geo. H. Strong,
HIS ATTORNEY

UNITED STATES PATENT OFFICE.

ABRAM W. DUCK, OF OAKLAND, CALIFORNIA.

BICYCLE-SEAT ATTACHMENT.

No. 924,541.  Specification of Letters Patent.  Patented June 8, 1909.

Application filed September 9, 1908. Serial No. 452,226.

*To all whom it may concern:*

Be it known that I, ABRAM W. DUCK, citizen of the United States, residing at Oakland, in the county of Alameda and State of California, have invented new and useful Improvements in Bicycle-Seat Attachments, of which the following is a specification.

My invention relates to improvements in the mounting of the saddles of tandem bicycles and the like, for a plurality of riders.

It consists in the combination of parts, and in details of construction which will be more fully explained by reference to the accompanying drawings, in which—

Figure 1 is a side elevation of the attachment as applied. Fig. 2 is a rear view of same. Figs. 3 and 4 are modified forms of connection. Fig. 5 is a detail of the sleeve. Fig. 6 is a detail of the bushing.

It is the object of my invention to provide an elastic and flexible support, especially for the rear supplemental saddles of bicycles, and means by which the excessive jar upon such saddles, due to their being located over the rear wheel, may be obviated.

A is the frame of a bicycle of the ordinary construction.

B is the saddle-post upon which the front saddle C may be supported in any usual or suitable manner, with the necessary springs for relieving vibration of this saddle.

2 is a bar hinged or flexibly connected with some part of the main frame A, or with the saddle-post B. I have here shown various ways of connecting. In Fig. 1 I have shown a collar 10 upon the top of the steering-post, with a rearwardly projecting lug or lugs to which the front end of the bar 2 is hinged. In Figs. 3 and 4, I have shown the bar 2 connected directly with the saddle-post, either by hinging it to the top of the post, or by bending the top of the post, extending it rearwardly, and connecting with it a piece 11, carrying the lugs, and forming the hinge joint 12 for the bar 2.

The bar 2 carries a sleeve 13, which is connected and fixed to the rear portion of the bar, and through this sleeve extends the curved yoke 6, the ends of which yoke extend down parallel upon each side, and pass through sleeves 5 which are suitably attached to or carried upon the outer ends of the rear axle upon which the wheel 4 is carried.

Suitable collars or enlargements are fixed near the junction of the parallel portions with the curve, and springs 7 extend between these collars and the sleeve 5.

As the side bars are slidable through the sleeves 5, it will be seen that any vibration caused by the wheel passing over rough portions of the road, will be absorbed by these springs.

In order to prevent an excessive recoil after a compression of the springs 7, I have shown the side bars of the yoke 6 extending through and below the sleeve 5, and having a nut or enlargement $6^a$ at the lower end. Between this and the lower ends of the sleeves 5 are coil springs $7^a$ which will be compressed by the upward or recoil movement of the yoke and saddle, and thus limit this motion, forming a short absorber for the apparatus.

The bight of the yoke being turnable in the collar or sleeve 13, it will have a sufficient yielding motion to compensate for the relative changes of position of the yoke and the bar 2. Collars $13^a$ fixed upon each side of the sleeve serve to retain the yoke in its central position.

It will be understood that the yoke 6 may be made tubular, and of sufficient size to allow the coiled springs 7 and $7^a$ to be fitted inside of the legs instead of outside.

The lower ends of the U-shaped yoke may carry foot rests 15 for the feet of the rear rider to rest upon, and these are thus protected from successive shocks and vibration while moving.

Handles 16 convenient for the use of the rear rider may be carried upon a bar which is fixed to or carried upon the saddle-supporting bar 2.

Various modifications of these connections may be made without altering the character of the device.

The sleeves 5 preferably have lugs $5^a$ upon one side, and a connection between these lugs and the rear forks of the machine by means of nuts 17 which secure the ends of the rear axle to the fork, said nuts having cylindrical extensions $17^a$ which fit the holes in the lugs $5^a$.

As the movements of the saddle-supporting bars 6 include slight rocking as well as sliding movements, this form of connection allows the tubes or sleeves to accommodate themselves to such movements.

Having thus described my invention, what I claim and desire to secure by Letters Patent is—

1. In a bicycle, a rear supplemental saddle support, said support consisting of a bar having its front end provided with means for attaching it to the main frame of a bicycle, a yoke for the rear end of said bar, sleeves mounted on the yoke having extensions by which they may be attached to the rear axle of a bicycle, said yoke having ends passing through and below said sleeves and springs on the yoke and abutting against the sleeves, said yoke being slidably mounted in said sleeves.

2. The combination with the main frame of a bicycle and the rear wheel and axle thereof, of a rear supplemental seat support, said support comprising a rearwardly extending bar having its front end hinged to the main frame, a saddle connected with said bar, a yoke having a central portion turnably connected with the bar said yoke extending downwardly toward the rear axle of the wheel, sleeves in which the yoke is slidably mounted, said yoke having ends passing through the sleeves to points below the same, springs on the yoke and abutting against said sleeves, and extensions from the sleeves adapted to be secured to the axle of the rear wheel.

3. The combination with a bicycle having a main frame a rear wheel, and an axle therefor, of a rear supplemental saddle support, said support comprising a bar having its front end hinged to said main frame, a supplemental saddle on the rear end of said bar, a yoke the bight of which is turnable relative to the bar, said yoke having members extending down upon each side of the rear wheel and having collars fixed to their lower ends, sleeves loosely mounted on the members of the yoke, springs above and below the sleeves and confined between the ends of the same and said collars, extensions from the sleeves, and means for securing said extensions to the rear axle, the extremities of the member of the yoke being provided with foot rests for the feet of a rear rider.

4. In an apparatus of the character described, a main frame, a rearwardly extending saddle carrying bar, legs connected with the bar, tubular sleeves through which said legs are slidable, said sleeves having lugs, and axle securing nuts having extensions upon which the lugs are mounted.

In testimony whereof I have hereunto set my hand in presence of two subscribing witnesses.

ABRAM W. DUCK.

Witnesses:
GEO. H. STRONG,
CHARLES EDELMAN.